US012587359B2

(12) United States Patent
Qian et al.

(10) Patent No.: US 12,587,359 B2
(45) Date of Patent: Mar. 24, 2026

(54) MULTI-PARTY COMPUTATION OF SPLIT PRIVATE DATA WITH ADDRESS GEO-CODED COMPONENT

(71) Applicant: Alipay (Hangzhou) Information Technology Co., Ltd., Zhejiang (CN)

(72) Inventors: Zhongtian Qian, Hangzhou (CN); Wuqiong Pan, Hangzhou (CN); Tao Wei, Hangzhou (CN); Tingting Li, Hangzhou (CN); Zhenqiang Wei, Hangzhou (CN); Tianyi Li, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 20 days.

(21) Appl. No.: 18/798,314

(22) Filed: Aug. 8, 2024

(65) Prior Publication Data

US 2024/0396707 A1　　Nov. 28, 2024

Related U.S. Application Data

(63) Continuation of application No. PCT/CN2023/071516, filed on Jan. 10, 2023.

(30) Foreign Application Priority Data

Mar. 8, 2022　(CN) .......................... 202210227407.2

(51) Int. Cl.
　　*G06F 21/40*　　(2013.01)
　　*G06F 21/78*　　(2013.01)
　　　　(Continued)

(52) U.S. Cl.
　　CPC .......... *H04L 9/008* (2013.01); *H04L 2209/46* (2013.01)

(58) Field of Classification Search
None
See application file for complete search history.

(56) References Cited

U.S. PATENT DOCUMENTS 12,438,703 B2 * 10/2025 Lu .......................... H04L 9/0825
2022/0255764 A1 * 8/2022 Li .......................... G06F 21/606
(Continued)

FOREIGN PATENT DOCUMENTS

CN　　101488923　　7/2009
CN　　104142977　　11/2014
(Continued)

OTHER PUBLICATIONS

Improving a Street-Based Geocoding Algorithm Using Machine Learning Techniques. Lee et al. MDPI. (Year: 2020).*
(Continued)

*Primary Examiner* — Venkat Perungavoor
(74) *Attorney, Agent, or Firm* — Fish & Richardson P.C.

(57) ABSTRACT

A computer-implemented method for data processing includes obtaining, by each secure multi-party computation (MPC) computation party of a system comprising a data provider and n secure MPC computation parties, a first data component from a data message sent by the data provider, where n is an integer greater than 3, where the first data component is one of a plurality of data components obtained after the data provider splits private data, and where the first data component is an address-geocoded component. Perform MPC processing to obtain a second data component by converting the first data component from the address-geocoded component and to a one-hot encoded component.

17 Claims, 5 Drawing Sheets

301

Each MPC computation party obtains a first data component from a data message sent by a data provider, where the first data component is one of a plurality of data components obtained after the data provider splits private data, and the first data component is an address-geocoded component

303

Convert the first data component from the address-geocoded component to a one-hot encoded component, to obtain a second data component, so as to perform MPC processing

(51) Int. Cl.
 *H04L 9/00* (2022.01)
 *G06F 21/60* (2013.01)

(56) References Cited

U.S. PATENT DOCUMENTS

| | | | | |
|---|---|---|---|---|
| 2024/0289492 | A1* | 8/2024 | Gupta | G06F 16/335 |
| 2024/0411514 | A1* | 12/2024 | Honorio Araujo da Silva | G06F 7/4836 |
| 2025/0254193 | A1* | 8/2025 | Wang | H04L 63/145 |

FOREIGN PATENT DOCUMENTS

| | | | | |
|---|---|---|---|---|
| CN | 106301393 | 1/2017 | | |
| CN | 110457232 | 11/2019 | | |
| CN | 111669366 | 9/2020 | | |
| CN | 111783130 | 10/2020 | | |
| CN | 112751665 | 5/2021 | | |
| CN | 113094763 | 7/2021 | | |
| CN | 113094763 A | * 7/2021 | | G06F 21/6245 |
| CN | 113158239 | 7/2021 | | |
| CN | 113688425 | 11/2021 | | |
| CN | 113824672 | 12/2021 | | |
| CN | 113887229 | 1/2022 | | |
| CN | 114726580 | 7/2022 | | |
| WO | WO 2017216801 | 12/2017 | | |
| WO | WO 2021237437 | 12/2021 | | |

OTHER PUBLICATIONS

International Search Report and Written Opinion in International Appln. No. PCT/CN2023/071516, mailed on Jun. 7, 2023, 9 pages (with Partial English translation).

Liu et al., "Test data compression technology based on blocking code and optimal sort algorithm," Journal of Electronic Measurement and Instrument, May 2009, 5(23):85-91 (with English Abstract).

* cited by examiner

301

Each MPC computation party obtains a first data component from a data message sent by a data provider, where the first data component is one of a plurality of data components obtained after the data provider splits private data, and the first data component is an address-geocoded component

303

Convert the first data component from the address-geocoded component to a one-hot encoded component, to obtain a second data component, so as to perform MPC processing

FIG. 3

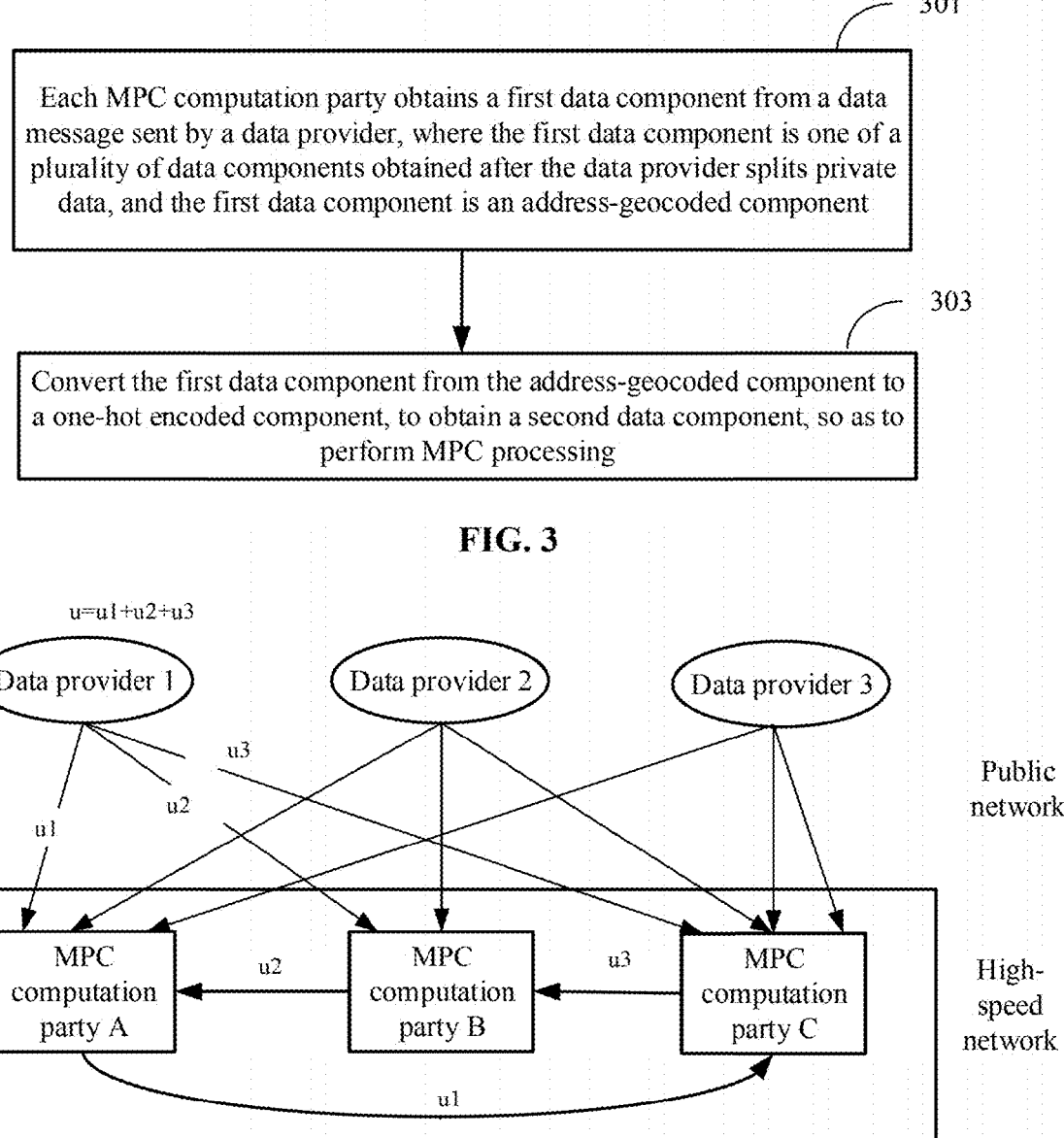

FIG. 4

MULTI-PARTY COMPUTATION OF SPLIT PRIVATE DATA WITH ADDRESS GEO-CODED COMPONENT

CROSS-REFERENCE TO RELATED APPLICATIONS

This application is a continuation of PCT Application No. PCT/CN2023/071516, filed on Jan. 10, 2023, which claims priority to Chinese Patent Application No. 202210227407.2, filed on Mar. 8, 2022, and each application is hereby incorporated by reference in its entirety.

TECHNICAL FIELD

One or more embodiments of this specification relate to the field of computer technologies, and in particular, to data processing methods and apparatuses.

BACKGROUND

It is well known that data usually include a large amount of privacy and confidential information, and are collectively referred to as private data. Many institutions such as enterprises and hospitals protect the private data. How to secretly share data over the Internet without disclosing privacy in cryptography is an important problem. In such a background, secure multi-party computation (MPC) emerges. MPC means that a group of participants who do not trust each other can perform collaborative computing while protecting data privacy. The participant is referred to as an MPC computation party.

The data provider randomly splits the private data into a plurality of data components, and provides the data component to each MPC computation party through a secure channel established between the data provider and the MPC computation party. A principle in which the data provider provides a data component to each MPC computation party is that each MPC computation party obtains only one of the data components rather than all of original data, and the original data can be restored after at least two MPC computation parties exchange the data components. Therefore, it can be ensured that each MPC computation party accesses only the data component. Even if an attacker breaks through an MPC computation party and steals or modifies the data component for a long time period, valid information cannot be obtained.

Because the data provider and the MPC computation party perform transmission through a public network, a data processing manner is urgently needed to reduce pressure placed by transmission of the data component between the data provider and the MPC computation party on transmission in the public network.

SUMMARY

One or more embodiments of this specification describe a data processing method, to reduce pressure placed by transmission of a data component on transmission in a public network.

According to a first aspect, a data processing method is provided, applied to a system including a data provider and N secure multi-party computation (MPC) computation parties, where N is an integer greater than 3, and the method includes: obtaining, by each MPC computation party, a first data component from a data message sent by the data provider, where the first data component is one of a plurality of data components obtained after the data provider splits private data, and the first data component is an address-geocoded component; and converting the first data component from the address-geocoded component to a one-hot encoded component, to obtain a second data component, so as to perform MPC processing.

In some implementable manners of the embodiments of this application, the converting the first data component from the address-geocoded component to a one-hot encoded component includes: obtaining a value of each bit of the one-hot encoded component based on a combination product of a value or a complement value of each bit of an address-geocoded component corresponding to each bit of the one-hot encoded component.

In some implementable manners of the embodiments of this application, a value of the $i^{th}$ bit of the one-hot encoded component is determined in the following manner: for the $j^{th}$ bit of address geocoding, where j starts from 0, if the $j^{th}$ bit of a binary value of i is 1, determining that a one-hot encoded component value of the current $i^{th}$ bit is addr[0]; otherwise, determining that a one-hot encoded component value of the current $i^{th}$ bit is a complement value of addr[0]; increasing a value of j by 1, and if the $j^{th}$ bit of the binary value of i is 1, multiplying the one-hot encoded component value of the current $i^{th}$ bit by addr[j], and updating the one-hot encoded component value of the current $i^{th}$ bit by using a value obtained through multiplication; otherwise, multiplying the one-hot encoded component value of the current $i^{th}$ bit by a complement value of addr[j], and updating the one-hot encoded component value of the current $i^{th}$ bit by using a value obtained through multiplication; and performing the step of increasing a value of j by 1, until j is a highest-order bit of the address-geocoded component, to obtain a one-hot encoded component value of the $i^{th}$ bit, where addr[0] is a value of the $0^{th}$ bit of the address-geocoded component, and addr[j] is a value of the $j^{th}$ bit of the address-geocoded component.

In some implementable manners of the embodiments of this application, when multiplication is performed, a product of some values of addr[j] in the address-geocoded component is computed to obtain a computed product value, and multiplication of the other values of addr[j] is converted into processing of addition of a plurality of addition items, where the plurality of addition items include the computed product value.

In some implementable manners of the embodiments of this application, the obtaining, by each MPC computation party, a first data component from a data message sent by the data provider includes: using, by each MPC computation party as the first data component, a data component obtained from the data message; or obtaining, by each MPC computation party, a data component from the data message, and performing arithmetic sharing processing by using the obtained data component as to-be-shared data, to obtain the first data component; or after obtaining a data component from the data message, performing, by each MPC computation party, zero-sharing processing, to obtain a fourth data component; combining the fourth data component and the data component obtained from the data message, to obtain a fifth data component; and performing arithmetic sharing processing by using the fifth data component as to-be-shared data, to obtain the first data component.

According to a second aspect, a data processing method is provided, applied to a system including a data provider and N MPC computation parties, where N is an integer greater than 3, and the method includes: splitting, by the data provider, data into a plurality of data components; and distributing the plurality of data components to the N MPC computation parties by using a data message, so that each MPC computation party receives one of the plurality of data components, and uses the one data component as a first data component, where the first data component is an address-geocoded component.

According to some implementable manners of the embodiments of this application, the splitting, by the data provider, data into a plurality of data components includes: splitting, by the data provider, one-hot encoding of data into a plurality of logical components, and representing the logical component through address geocoding, to obtain the address-geocoded component; and the distributing the plurality of data components to the N MPC computation parties by using a data message includes: sending a plurality of obtained address-geocoded components to the N MPC computation parties by using the data message.

According to a third aspect, a data processing apparatus is provided, applied to a system including a data provider and N secure multi-party computation (MPC) computation parties, where N is an integer greater than 3, and the apparatus is located at the MPC computation party, and includes: a data obtaining unit, configured to obtain a first data component from a data message sent by the data provider, where the first data component is one of a plurality of data components obtained after the data provider splits private data, and the first data component is an address-geocoded component; and an encoding conversion unit, configured to convert the first data component from the address-geocoded component to a one-hot encoded component, to obtain a second data component, so as to perform MPC processing.

According to a fourth aspect, a data processing apparatus is provided, applied to a system including a data provider and N secure multi-party computation (MPC) computation parties, where N is an integer greater than 3, and the apparatus is located at the data provider, and includes: a data splitting unit, configured to split data into a plurality of data components; and a data sending unit, configured to distribute the plurality of data components to the N MPC computation parties by using a data message, so that each MPC computation party receives one of the plurality of data components, and uses the one data component as a first data component, where the first data component is an address-geocoded component.

According to a fifth aspect, a computing device is provided, including a memory and a processor. The memory stores executable code, and when executing the executable code, the processor implements the method of the first aspect.

According to the methods and the apparatuses provided in the embodiments of this specification, the data provider transmits the address-geocoded component to the MPC computation party, and each MPC computation party converts the received address-geocoded component into the one-hot encoded component, to reduce a data amount transmitted through a public network.

BRIEF DESCRIPTION OF DRAWINGS

FIG. 3 is a flowchart illustrating a data processing method, according to some other embodiments;

FIG. 4 is an example diagram illustrating data transmission, according to some embodiments of this application;

DESCRIPTION OF EMBODIMENTS

The terms used in the embodiments of this application are merely used to describe specific embodiments, and are not intended to limit this application. The terms "a", "said", and "the" of singular forms used in the embodiments of this application and the appended claims are also intended to include plural forms, unless otherwise specified in the context clearly.

It should be understood that the term "and/or" used in this specification merely describes an association relationship between associated objects and indicates that three relationships can exist. For example, A and/or B can indicate the following three cases: Only A exists, both A and B exist, and only B exists. In addition, the character "/" in this specification usually indicates an "or" relationship between the associated objects.

Depending on the context, for example, the word "if" used here can be interpreted as "while", "when", "in response to determining", or "in response to detecting". Similarly, depending on the context, the phrase "if determining . . . " or "if detecting (the condition or event stated)" can be explained as "when determining . . . ", "in response to determining . . . ", "when detecting (the condition or event stated)", or "in response to detecting (the condition or event stated)".

Figure 1:
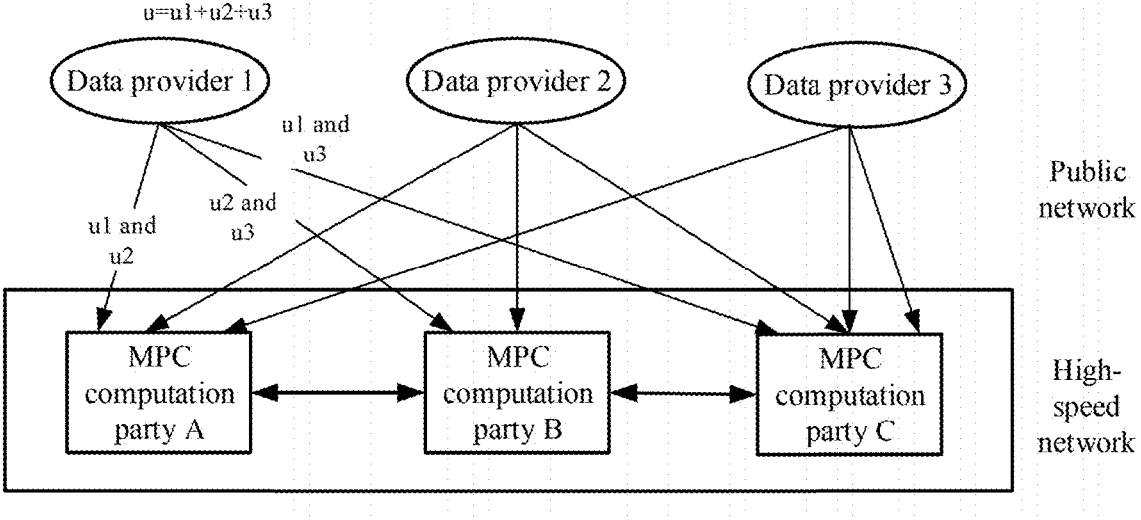
FIG. 1 is an architectural diagram illustrating a system to which some embodiments of this application are applicable.

FIG. 1 is an architectural diagram illustrating a system to which some embodiments of this application are applicable. As shown in FIG. 1, the system includes a data provider and N MPC computation parties. N is an integer greater than 3, and that N is 3 is used as an example in FIG. 1. Trusted-environment-based cryptographic computing (TECC) is based on a secure multi-party computation (MPC) algorithm, and is a secure and efficient cryptographic computing method. In a TECC application scenario, the MPC computation party can be each trusted execution environment (TEE).

Currently, in an existing data component transmission manner, a data provider and an MPC computation party perform transmission in a public network. In this transmission manner, each data provider needs to transmit $(N-1)*N$ data components.

FIG. 1 is used as an example. A data provider 1 splits data u into u1, u2, and u3; and then, provides u1 and u2 to an MPC computation party A, provides u2 and u3 to an MPC computation party B, and provides u3 and u1 to an MPC computation party C.

In a model training or prediction scenario such as machine learning, private data provided by a data provider are one-hot encoded data of sample feature data. Correspondingly, a first data component transmitted by the data provider is a logical component into which the one-hot encoded data are split. The logical component is a data component whose element is a binary value. For example, for a data set whose feature quantity is d, whose bin is b, and whose sample quantity is n, X[d][b][n] can be used to represent one-hot encoding of sample feature data, and a value of each element of X[d][b][n] is 0 or 1. Each element occupies 1 bit, and is split into logical components. A size of each logical component is the same as that of X[d][b][n].

Solutions provided in this specification are described below with reference to the accompanying drawings.

Figure 2:
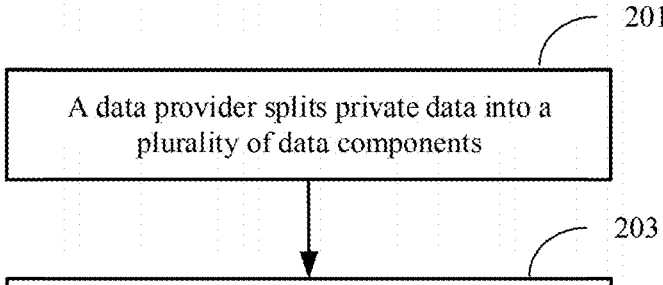
FIG. 2 is a flowchart illustrating a data processing method, according to some embodiments.

FIG. 2 is a flowchart illustrating a data processing method, according to some embodiments. The method is performed by a data provider in the system shown in FIG. 1. As shown in FIG. 2, the method includes the following steps: Step 201: The data provider splits private data into a plurality of data components.

Step 203: Distribute the plurality of data components to N MPC computation parties by using a data message, so that each MPC computation party receives one of the plurality of data components, and uses the one data component as a first data component, where the first data component is an address-geocoded component.

FIG. 3 is a flowchart illustrating a data processing method, according to some other embodiments. The method is performed by each MPC computation party in the system shown in FIG. 1. As shown in FIG. 3, the method includes the following steps. Step 301: Each MPC computation party obtains a first data component from a data message sent by a data provider, where the first data component is one of a plurality of data components obtained after the data provider splits private data, and the first data component is an address-geocoded component.

Step 303: Convert the first data component from the address-geocoded component to a one-hot encoded component, to obtain a second data component, so as to perform MPC processing.

According to the data processing methods shown in FIG. 2 and FIG. 3, the data provider transmits the address-geocoded component instead of transmitting the one-hot encoded component that originally needs to be transmitted to the MPC computation party. Each MPC computation party converts the received address-geocoded component into the one-hot encoded component, to reduce a data amount transmitted through a public network.

In some implementable manners, the data provider can still split the private data into the plurality of data components in an existing transmission manner. Then, two data components are sent to each MPC computation party. The $1^{st}$ data component sent to any MPC computation party is the same as the $2^{nd}$ data component sent to a previous MPC computation party of the MPC computation party.

FIG. 1 is used as an example. A data provider 1 splits data u into u1, u2, and u3; and then, provides u1 and u2 to an MPC computation party A, provides u2 and u3 to an MPC computation party B, and provides u3 and u1 to an MPC computation party C. In other words, in step 301, a first data component obtained by the MPC computation party A is u1 and u2. Because both u1 and u2 are logical components, u1 and u2 are respectively referred to as a first logical component and a second logical component. Correspondingly, a first logical component and a second logical component that are included in a first data component obtained by the MPC computation party B are respectively u2 and u3, and a first logical component and a second logical component that are included in a first data component obtained by the MPC computation party C are respectively u3 and u1.

In some other implementable manners, the data provider can respectively send N data components to N MPC computation parties. In other words, each MPC computation party receives one of the data components, and each MPC computation party receives a different data component.

In this case, in step 301, after receiving the data component, the MPC computation party can obtain the first data component by performing arithmetic sharing processing by using the received data component.

The arithmetic sharing processing is: sharing local to-be-shared data with a next MPC computation party after encrypting the local to-be-shared data, and receiving and decrypting data shared by a previous MPC computation party. Then, the received decrypted data and the local to-be-shared data are combined, to obtain the first data component. In other words, the arithmetic sharing processing is a process in which each MPC computation party performs data sharing in a cyclic order. Each MPC computation party performs arithmetic sharing processing in a cyclic order. In addition, a key used when the MPC computation party performs encryption is the same as a key used when the next MPC computation party performs decryption. The key is preconfigured or pre-agreed upon.

This implementation is described by using the three MPC computation parties shown in FIG. 1 as an example. As shown in FIG. 4, the data provider still splits original data into three data components u1, u2, and u3; and then, transmits u1 to the MPC computation party A, transmits u2 to the MPC computation party B, and transmits u3 to the MPC computation party C.

The MPC computation party A, the MPC computation party B, and the MPC computation party C jointly perform one time of arithmetic sharing processing. All MPC computation parties pre-agree upon an interaction key, so that each MPC computation party locally stores an interaction key pair (share_rng_d, share_rng_u). share_rng_d of the MPC computation party A is the same as share_rng_u of the MPC computation party C, share_rng_d of the MPC computation party B is the same as share_rng_u of the MPC computation party A, and share_rng_d of the MPC computation party C is the same as share_rng_u of the MPC computation party B.

During arithmetic sharing processing, the MPC computation party A encrypts u1 by using share_rng_d, and then transmits the encrypted u1 to the MPC computation party C. The MPC computation party C decrypts the encrypted u1 by using share_rng_u, to obtain u1.

The MPC computation party B encrypts u2 by using share_rng_d, and then transmits the encrypted u2 to the MPC computation party A. The MPC computation party A decrypts the encrypted u2 by using share_rng_u, to obtain u2.

The MPC computation party C encrypts u3 by using share_rng_d, and then transmits the encrypted u3 to the MPC computation party B. The MPC computation party B decrypts the encrypted u3 by using share_rng_u, to obtain u3.

After arithmetic sharing processing, the MPC computation party A locally stores u1 and u2, the MPC computation party B locally stores u2 and u3, and the MPC computation party C locally stores u3 and u1. However, only three data components (logical components) need to be transmitted in the public network. In other words, six data components that originally need to be transmitted are reduced to three data components. However, when MPC computation parties perform arithmetic sharing, pressure placed on transmission in a network is very small because arithmetic sharing is performed in a high-speed network.

In still some other implementable manners, a quantity of data components obtained by the data provider through splitting is less than N, only one data component is transmitted to one of the MPC computation parties, and the other MPC obtains zero data components. In other words, some MPC computation parties each receive one of the data components, each MPC computation party receives a different data component, and the other MPC computation parties receive zero data components.

In this case, in step 301, after obtaining the data component (1 or 0 data components) from the data message, the MPC computation party can perform zero-sharing processing, to obtain a fourth data component; combine the obtained fourth data component and the data component obtained from the data message, to obtain a fifth data component; and perform arithmetic sharing processing by using the fifth data component as the to-be-shared data, to obtain the first data component.

Zero-sharing processing means that each MPC computation party independently generates a data component, and the sum of data components generated by all MPC computation parties is 0. Specifically, the zero-sharing processing includes: The MPC computation party generates a first derived value by using a locally held first zero-sharing key, and generates a second derived value by using a locally held second zero-sharing key; and obtains the fourth data component based on a difference between the first derived value and the second derived value. All the MPC computation parties pre-agree upon a zero-sharing key, so that each MPC computation party locally stores a key pair (prng, prngu) including a first zero-sharing key and a second zero-sharing key. prng of the MPC computation party A is the same as prngu of the MPC computation party C, prng of the MPC computation party B is the same as prngu of the MPC computation party A, and prng of the MPC computation party C is the same as prngu of the MPC computation party B.

Figure 5:
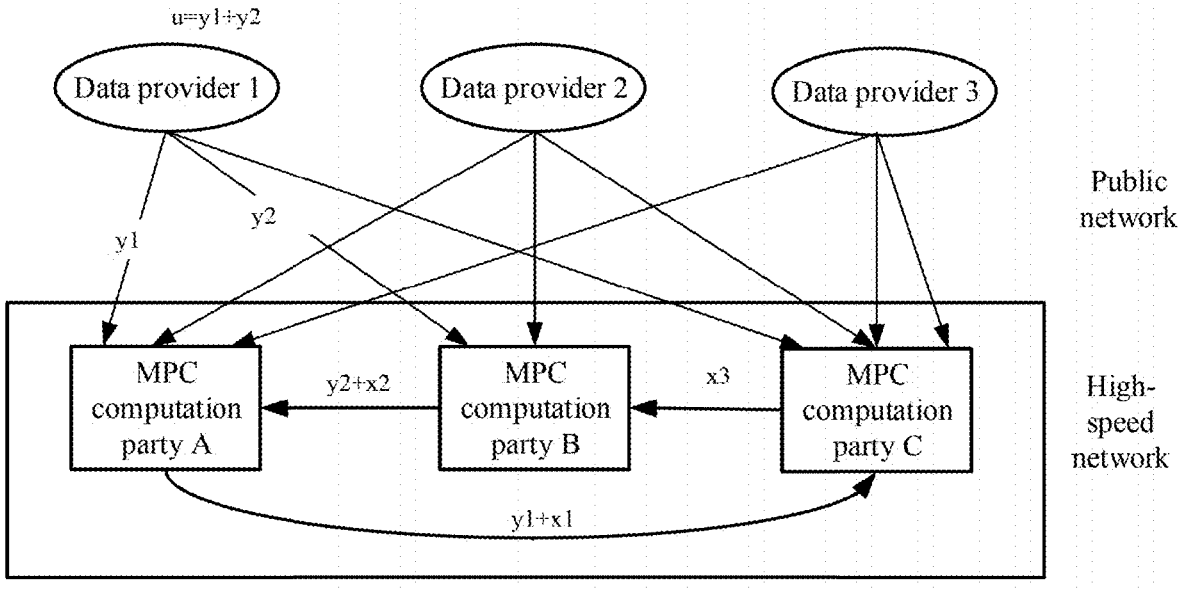
FIG. 5 is an example diagram illustrating other data transmission, according to some embodiments of this application.

This implementation is described by using the three MPC computation parties shown in FIG. 1 as an example. As shown in FIG. 5, the data provider still splits original data into two data components y1 and y2; and then, transmits y1 to the MPC computation party A, and transmits y2 to the MPC computation party B. The MPC computation party C obtains zero data components.

The MPC computation party A, the MPC computation party B, and the MPC computation party C jointly perform one time of zero-sharing processing, to respectively obtain three components x1, x2, and x3 of 0. Specifically, each MPC computation party generates a first derived value buf1 by using prng, generates a second derived value buf2 by using prngu, and uses a value of buf1−buf2 as the fourth data component obtained through zero-sharing processing.

The MPC computation party A combines results x1 and y1 of zero-sharing processing, to obtain a fifth data component x1+y1; the MPC computation party B combines results x2 and y2 of zero-sharing processing, to obtain a fifth data component x2+y2; and the MPC computation party C combines a result x3 of zero-sharing processing and the received zero data components, to obtain a fifth data component x3.

Then, the MPC computation party A, the MPC computation party B, and the MPC computation party C jointly perform one time of arithmetic sharing processing.

During arithmetic sharing processing, the MPC computation party A encrypts x1+y1 by using share_rng_d, and then transmits the encrypted x1+y1 to the MPC computation party C. The MPC computation party C decrypts the encrypted x1+y1 by using share_rng_u, to obtain x1+y1.

The MPC computation party B encrypts x2+y2 by using share_rng_d, and then transmits the encrypted x2+y2 to the MPC computation party A. The MPC computation party A decrypts the encrypted x2+y2 by using share_rng_u, to obtain x2+y2.

The MPC computation party C encrypts x3 by using share_rng_d, and then transmits the encrypted x3 to the MPC computation party B. The MPC computation party B decrypts the encrypted x3 by using share_rng_u, to obtain x3.

After arithmetic sharing processing, the MPC computation party A locally stores u1=x1+y1 and u2=x2+y2, the MPC computation party B locally stores u2=x2+y2 and u3=x3, and the MPC computation party C locally stores u3=x3 and u1=x1+y1. However, only two data components need to be transmitted in the public network. In other words, six data components that originally need to be transmitted are reduced to two data components. However, when MPC computation parties perform arithmetic sharing, pressure placed on transmission in a network is very small because arithmetic sharing is performed in a high-speed network.

A quantity of data components (logical components) can be reduced from 6 to 3 or 2 in the manner described in the above-mentioned embodiments.

In the above-mentioned embodiments, the data component obtained through splitting in step 201 is one-hot encoding, and then a one-hot encoded data component is further represented by using an address-geocoded component. In other words, when sending the logical component, the data provider uses address geocoding to represent one-hot encoding, to compact a transmitted data amount. Address geocoding is using a binary integer to represent a location of 1 in one-hot encoding. That a three-dimensional array X[d][b][n] is used to represent sample feature data are still used as an example. If originally used b-bit one-hot encoding is changed to address geocoding for representation, the data amount can be compacted to ceil( ) bits. Ceil( ) is a round up function.

In b-bit one-hot encoding, only 1 bit is 1, and the other bits are 0. Address geocoding of ceil( ) bits is used to represent the location of 1. For example, one-hot encoding "0000000001000" can be represented by using address geocoding "1010", and 1 is the $10^{th}$ bit in one-hot encoding.

Step 303 of "converting the first data component from the address-geocoded component to a one-hot encoded component, to obtain a second data component, so as to perform MPC processing" is mainly described in detail below with reference to some embodiments.

For the MPC computation party, the obtained second data component is an address-geocoded representation of one-hot encoding, and needs to be converted into a one-hot encoded component. A conversion idea is that a value of each bit of the one-hot encoded component can be represented as a combination product of a value or a complement value of each bit of the address-geocoded component. Therefore, a combination product of a value or a complement value (namely, a value obtained through complementing) of each bit of an address-geocoded component corresponding to each bit of the one-hot encoded component can be used to obtain a value of each bit of the one-hot encoded component.

Figure 6:
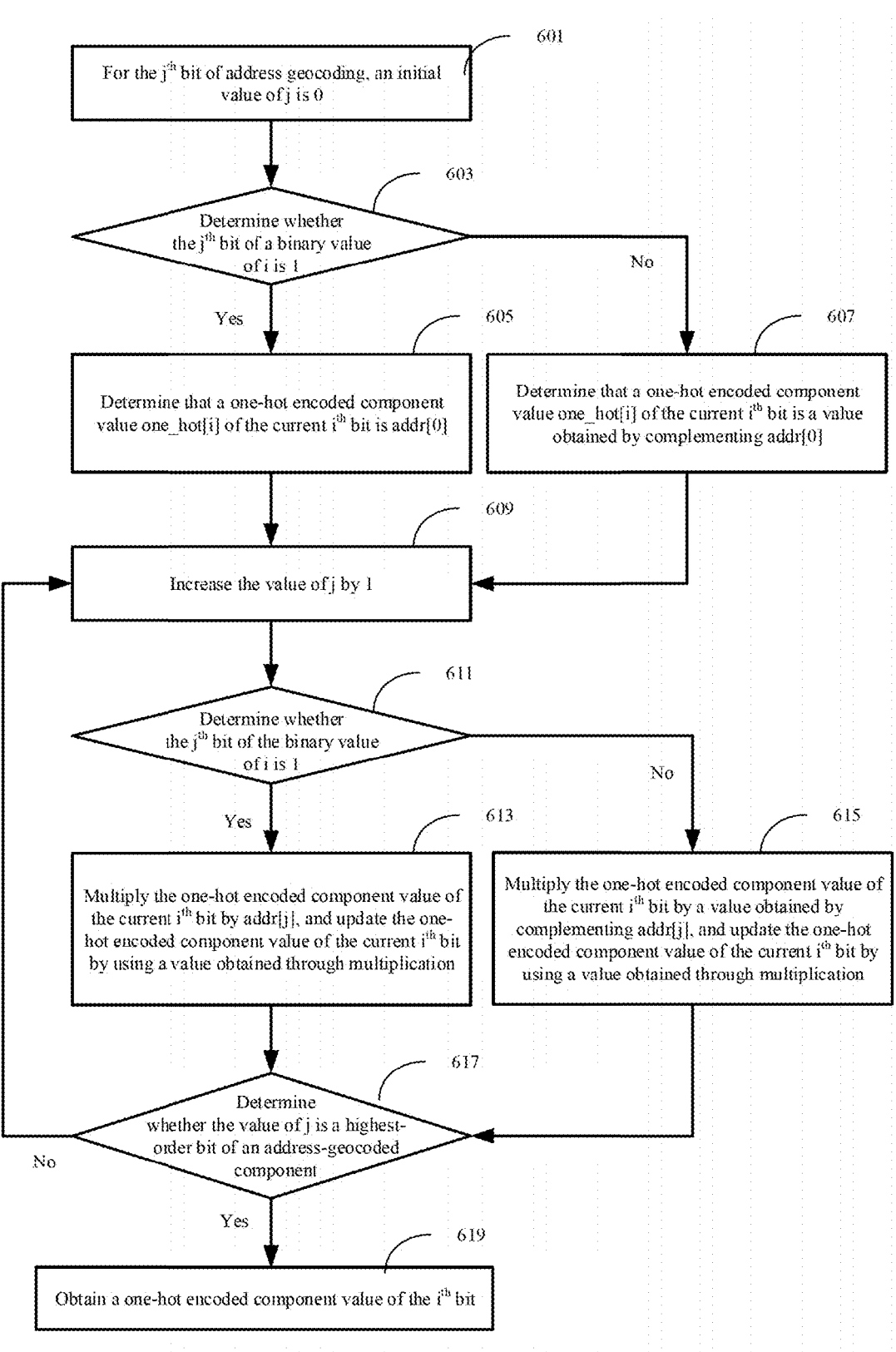
FIG. 6 is a flowchart illustrating a method for converting an address-geocoded component into one-hot encoded component, according to some embodiments of this application.

FIG. 6 is a flowchart illustrating a method for converting an address-geocoded component into one-hot encoded component, according to some embodiments of this application. As shown in FIG. 6, the following steps each are used to determine a value of the $i^{th}$ bit of the one-hot encoded component. Here, i sequentially ranges from 0 to b−1.

Step 601: For the $j^{th}$ bit of address geocoding, an initial value of j is 0.

Step 603: Determine whether the $j^{th}$ bit of a binary value of i is 1, and perform step 605 if yes; otherwise, perform step 607.

Step 605: Determine that a one-hot encoded component value one_hot[i] of the current $i^{th}$ bit is addr[0], and perform step 609.

That is, one_hot[i]=addr[0].

Here, addr[0] is a value of the $0^{th}$ bit of the address-geocoded component.

Step 607: Determine that a one-hot encoded component value one_hot[i] of the current $i^{th}$ bit is a value obtained by complementing addr[0], and perform step 709.

That is, one_hot[i]=~addr[0].

A symbol "~" indicates to complement logic of MPC processing.

Step 609: Increase the value of j by 1.

Step 611: Determine whether the $j^{th}$ bit of the binary value of i is 1, and perform step 613 if yes; otherwise, perform step 615.

Step 613: Multiply the one-hot encoded component value of the current $i^{th}$ bit by addr[j], and update the one-hot encoded component value of the current $i^{th}$ bit by using a value obtained through multiplication, to perform step 617.

That is, one_hot[i]=one_hot[i]×addr[j].

A symbol "×" is a multiplication operation in MPC processing.

Step 615: Multiply the one-hot encoded component value of the current $i^{th}$ bit by a value obtained by complementing addr [j], and update the one-hot encoded component value of the current $i^{th}$ bit by using a value obtained through multiplication, to perform step 617.

That is, one_hot[i]=one_hot[i]×(~addr[j]).

Step 617: Determine whether the value of j is a highest-order bit of the address-geocoded component, and perform step 619 if yes; otherwise, perform step 609.

Step 619: Obtain a one-hot encoded component value of the $i^{th}$ bit.

The above-mentioned procedure is executed for each of values of i from 0 to b−1, so that a one-hot encoded component value of each bit can be obtained, and finally, one-hot encoded component values of b bits are obtained.

Here, it is worthwhile to note that the first data component obtained by each MPC computation party actually includes a plurality of data components. In scenarios shown in FIG. 1, FIG. 3, and FIG. 5, the first data component obtained by each MPC computation party includes two data components. For example, the first data component obtained by the MPC computation party A is u1 and u2, the first data component obtained by the MPC computation party B is u2 and u3, and the first data component obtained by the MPC computation party C is u3 and u1. In other words, addj[0] and addr[j] each include a plurality of component values (there are two components in the scenarios shown in FIG. 1, FIG. 3, and FIG. 5). Correspondingly, one_hot[i] also includes a plurality of component values. That is, after the first data component is converted from address geocoding to one-hot encoding, the obtained second data component also includes a plurality of components, and the plurality of components are one-hot encoded components.

Based on the above-mentioned compaction algorithm, the data provider uses the address-geocoded component to replace the one-hot encoded component for transmission in the public network, to reduce a data transmission amount in the public network to $$\frac{\text{ceil}(\log_2 b)}{b}$$

of an original amount.

For example, one-hot encoded components of 16 bits are represented by using address-geocoded components of 4 bits. It is assumed that address geocoding received by the MPC computation party is addr[4]={a, b, c, d}, and upper-case letters A, B, C, and D respectively represent logical complement values of MPC processing of a, b, c, and d.

Based on a procedure shown in FIG. 6, values of bits of the one-hot encoded component can be obtained: One_hot [0]=ABCD.

"ABCD" is a representation of "A×B×C×D" whose multiplication symbol is omitted. The following representations are all made in such a manner.

```
one_hot[1] = ABCd
one_hot[2] = ABcD
one_hot[3] = ABcd
one_hot[4] = AbCD
one_hot[5] = aBcD
one_hot[6] = AbcD
one_hot[7] = Abcd
one_hot[8] = aBCD
one_hot[9] = aBCd
one_hot[10] = aBcD
. . .
```

During the above-mentioned computation, multiplication can be optimized. Because interaction between MPC computation parties does not need to be performed for an addition operation in MPC processing, and interaction between MPC computation parties needs to be performed for a multiplication operation, multiplication can be converted into addition as much as possible, to reduce multiplication operations as much as possible. Specifically, when multiplication is performed, a product of some values of addr[j] in the address-geocoded component can be computed to obtain a computed product value, and multiplication of the other values of addr[j] is converted into processing of addition of a plurality of addition items. Here, the plurality of addition items include the computed product value. Some addition items can be computed product values, or all addition items can be computed product values.

For example, ab, abc, Abc, aBc, abcd, Abcd, aBcd, ABcd, abCd, AbCd, and aBCd are computed by using a multiplication operation, and other multiplication is converted into addition of the above-mentioned computed results:

```
Ab = ab + b
aB = ab + a
AB = Ab + A
ABc = abc + Abc + aBc + c
abC = abc + ab
AbC = Abc + Ab
aBC = aBc + aB
ABC = ABc + AB
ABCd = abcd + Abcd + aBcd + ABcd + abCd + AbCd + aBCd + d
abcD = abcd + abc
AbcD = Abcd + Abc
ABCD = ABCd + ABC
ABcD = ABcd + ABc
AbCD = AbCd + AbC
aBCD = aBCd + aBC
aBcD = aBcd + aBc
abCD = abCd + abC
```

Specific embodiments of this specification are described above. Other embodiments fall within the scope of the appended claims. In some cases, the actions or steps described in the claims can be performed in an order different from that in the embodiments, and the desired results can still be achieved. In addition, the process depicted in the accompanying drawings does not necessarily need a particular sequence or consecutive sequence to achieve the desired results. In some implementations, multitasking and parallel processing are feasible or may be advantageous.

Figures 7, 8:
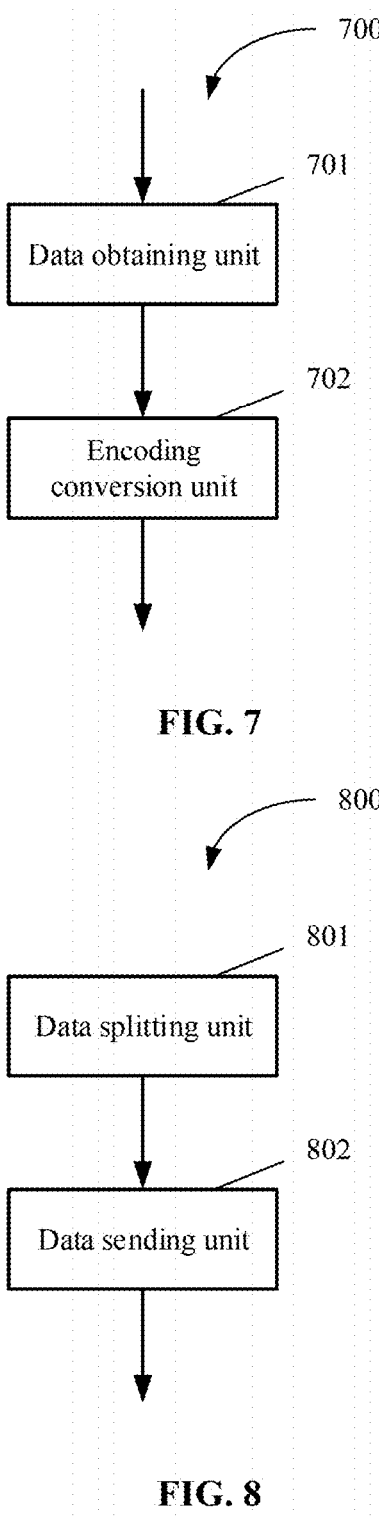
FIG. 7 is a schematic block diagram illustrating a data processing apparatus, according to some embodiments.
FIG. 8 is a schematic block diagram illustrating a data processing apparatus, according to some other embodiments.

According to some embodiments of another aspect, a data processing apparatus is provided. FIG. 7 is a schematic block diagram illustrating a data processing apparatus, according to some embodiments. It can be understood that the apparatus can be located at an MPC computation party in the system shown in FIG. 1, and can be embodied in a form of an application or a functional unit such as a plug-in or a software development kit (SDK) in the application program. As shown in FIG. 7, the apparatus 700 includes a data obtaining unit 701 and an encoding conversion unit 702. Main functions of all constitutional units are as follows: The data obtaining unit 701 is configured to obtain a first data component from a data message sent by a data provider, where the first data component is one of a plurality of data components obtained after the data provider splits private data, and the first data component is an address-geocoded component.

The encoding conversion unit 702 is configured to convert the first data component from the address-geocoded component to a one-hot encoded component, to obtain a second data component, so as to perform MPC processing.

In some implementable manners, the encoding conversion unit 702 can be specifically configured to obtain a value of each bit of the one-hot encoded component based on a combination product of a value or a complement value of each bit of an address-geocoded component corresponding to each bit of the one-hot encoded component.

In some more specific implementations, the encoding conversion unit 702 can determine a value of the $i^{th}$ bit of the one-hot encoded component in the following manner: for the $j^{th}$ bit of address geocoding, where j starts from 0, if the $j^{th}$ bit of a binary value of i is 1, determining that a one-hot encoded component value of the current $i^{th}$ bit is addr[0]; otherwise, determining that a one-hot encoded component value of the current $i^{th}$ bit is a complement value of addr[0]; increasing a value of j by 1, and if the $j^{th}$ bit of the binary value of i is 1, multiplying the one-hot encoded component value of the current $i^{th}$ bit by addr[j], and updating the one-hot encoded component value of the current $i^{th}$ bit by using a value obtained through multiplication; otherwise, multiplying the one-hot encoded component value of the current $i^{th}$ bit by a complement value of addr[j], and updating the one-hot encoded component value of the current $i^{th}$ bit by using a value obtained through multiplication; and performing the step of increasing a value of j by 1, until j is a highest-order bit of the address-geocoded component, to obtain a one-hot encoded component value of the $i^{th}$ bit, where addr[0] is a value of the $0^{th}$ bit of the address-geocoded component, and addr[j] is a value of the $j^{th}$ bit of the address-geocoded component.

In some other preferred implementation, when multiplication is performed, the encoding conversion unit 702 computes a product of some values of addr[j] in the address-geocoded component to obtain a computed product value, and converts multiplication of the other values of addr[j]

into processing of addition of a plurality of addition items. Here, the plurality of addition items include the computed product value.

In some implementable manners, the data obtaining unit 701 can use, as the first data component, a data component obtained from the data message.

In some other implementable manners, the data obtaining unit 701 can obtain a data component from the data message, and perform arithmetic sharing processing by using the obtained data component as to-be-shared data, to obtain the first data component.

In still some other implementable manners, after obtaining a data component from the data message, the data obtaining unit 701 can perform zero-sharing processing, to obtain a fourth data component; combine the fourth data component and the data component obtained from the data message, to obtain a fifth data component; and perform arithmetic sharing processing by using the fifth data component as to-be-shared data, to obtain the first data component.

According to some embodiments of another aspect, a data processing apparatus is provided. FIG. 8 is a schematic block diagram illustrating a data processing apparatus, according to some embodiments. It can be understood that the apparatus can be located at a data provider in the system shown in FIG. 1, and can be embodied in a form of an application or a functional unit such as a plug-in or a software development kit (SDK) in the application program. As shown in FIG. 8, the apparatus 800 includes a data splitting unit 801 and a data sending unit 802. Main functions of all constitutional units are as follows: The data splitting unit 801 is configured to split data into a plurality of data components.

The data sending unit 802 is configured to distribute the plurality of data components to N MPC computation parties by using a data message, so that each MPC computation party receives one of the plurality of data components, and uses the one data component as a first data component. The first data component is an address-geocoded component.

In some implementable manners, the data splitting unit 801 can split one-hot encoding of data into a plurality of logical components, and represent the logical component through address geocoding, to obtain the address-geocoded component. Correspondingly, the data sending unit 802 can send a plurality of address-geocoded components obtained by the data splitting unit 801 to the N MPC computation parties by using the data message.

In some implementable manners, the data splitting unit 801 obtains N data components through splitting, and the data sending unit 802 sends two data components to each MPC computation party. The $1^{st}$ data component sent to any MPC computation party is the same as the $2^{nd}$ data component sent to a previous MPC computation party of the MPC computation party. The MPC computation parties are sorted circularly.

In some other implementable manners, the data splitting unit 801 obtains N data components through splitting, and the data sending unit 802 respectively sends the N data components to the N MPC computation parties. One data component received by each MPC computation party is the first data component, and each MPC computation party receives a different data component.

In some implementable manners, the data splitting unit 801 obtains M data components through splitting, where M is greater than 1 and less than N, and the data sending unit 802 individually sends the M data components to the N MPC computation parties, so that some MPC computation parties each receive one data component and each MPC computation party receives a different data component, and the other MPC computation parties receive zero data components.

According to some embodiments of another aspect, a computer-readable storage medium is further provided. The computer-readable storage medium stores a computer program, and when the computer program is executed on a computer, the computer is enabled to perform the method described with reference to FIG. 2, FIG. 3, FIG. 6, or FIG. 7.

According to some embodiments of still another aspect, a computing device is further provided, including a memory and a processor. The memory stores executable code, and when the processor executes the executable code, the method described with reference to FIG. 2, FIG. 3, FIG. 6, or FIG. 7 is implemented.

With development of time and technology, a computer-readable storage medium has a broader meaning. A propagation path of a computer program is not limited to a tangible medium, can be directly downloaded from a network, etc. Any combination of one or more computer-readable storage media can be used. The computer-readable storage medium can be, by way of example rather than limitation, an electrical, magnetic, optical, electromagnetic, infrared, or semiconductor system, apparatus, or device, or any combination thereof. More specific examples (a non-exhaustive list) of the computer-readable storage medium include the following: an electrical connection with one or more leads, a portable computer disk, a hard disk, a random access memory (RAM), a read-only memory (ROM), an erasable programmable read-only memory (an EPROM or a flash memory), an optical fiber, a portable compact disk read-only memory (CD-ROM), an optical storage component, a magnetic storage device, or any suitable combination thereof. In this specification, the computer-readable storage medium can be any tangible medium that includes or stores a program, and the program can be used by or in combination with an instruction execution system, apparatus, or component.

The processor can include one or more single-core processors or a multi-core processor. The processor can include any combination of a general-purpose processor or a dedicated processor (for example, an image processor, an application processor, or a baseband processor).

Embodiments of this specification are all described in a progressive manner. For same or similar parts in the embodiments, mutual references can be made to the embodiments. Each embodiment focuses on a difference from other embodiments. In particular, the apparatus embodiment is basically similar to the method embodiment, and therefore is described briefly. For related parts, references can be made to related descriptions in the method embodiment.

A person skilled in the art should be aware that, in the above-mentioned one or more examples, functions described in this application can be implemented by hardware, software, firmware, or any combination thereof. When being implemented by software, these functions can be stored in a computer-readable medium or transmitted as one or more instructions or codes in the computer-readable medium.

The specific implementations mentioned above provide further detailed explanations of the objectives, technical solutions, and beneficial effects of this application. It should be understood that the above-mentioned descriptions are merely specific implementations of this application and are not intended to limit the protection scope of this application. Any modifications, equivalent replacements, improvements, etc. made on the basis of the technical solutions of this application shall all fall within the protection scope of this application.

What is claimed is:

1. A computer-implemented method for data processing, comprising:

obtaining, by each secure multi-party computation (MPC) computation party of a system comprising a data provider and n secure MPC computation parties, a first data component from a data message sent by the data provider, wherein n is an integer greater than 3, wherein the first data component is one of a plurality of data components obtained after the data provider splits private data, and wherein the first data component is an address-geocoded component; and performing, as MPC processing and to obtain a second data component, conversion of the first data component from the address-geocoded component and to a one-hot encoded component, wherein the conversion comprises obtaining a value of each bit of the one-hot encoded component based on a combination product of a value or a complement value of each bit of an address-geocoded component corresponding to each bit of the one-hot encoded component.

2. The computer-implemented method of claim 1, wherein a value of the $i^{th}$ bit of the one-hot encoded component is determined by:

for the $j^{th}$ bit of address geocoding, wherein j starts from 0, if the $j^{th}$ bit of a binary value of i is 1, determining that a one-hot encoded component value of the current $i^{th}$ bit is addr [0]; otherwise, determining that a one-hot encoded component value of the current $i^{th}$ bit is a complement value of addr [0];

increasing a value of j by 1, and if the $j^{th}$ bit of the binary value of i is 1, multiplying the one-hot encoded component value of the current $i^{th}$ bit by addr [j], and updating the one-hot encoded component value of the current $i^{th}$ bit by using a value obtained through multiplication; otherwise, multiplying the one-hot encoded component value of the current $i^{th}$ bit by a complement value of addr [j], and updating the one-hot encoded component value of the current $i^{th}$ bit by using a value obtained through multiplication; and performing the step of increasing a value of j by 1, until j is a highest-order bit of the address-geocoded component, to obtain a one-hot encoded component value of the $i^{th}$ bit, wherein addr [0] is a value of the $0^{th}$ bit of the address-geocoded component, and addr [j] is a value of the $j^{th}$ bit of the address-geocoded component.

3. The computer-implemented method of claim 2, wherein when multiplication is performed, a product of some values of addr [j] in the address-geocoded component is computed to obtain a computed product value, and multiplication of other values of addr [j] is converted into processing of addition of a plurality of addition items, wherein the plurality of addition items comprises the computed product value.

4. The computer-implemented method of claim 1, wherein the obtaining, by each secure MPC computation party, a first data component from a data message sent by the data provider comprises:

using, by each secure MPC computation party as the first data component, a data component obtained from the data message.

5. The computer-implemented method of claim 1, wherein the obtaining, by each secure MPC computation party, a first data component from a data message sent by the data provider comprises:

obtaining, by each secure MPC computation party and as an obtained data component, a data component from the data message, and performing arithmetic sharing processing by using the obtained data component as to-be-shared data, to obtain the first data component.

6. The computer-implemented method of claim 1, wherein the obtaining, by each secure MPC computation party, a first data component from a data message sent by the data provider comprises:

after obtaining a data component from the data message, performing, by each secure MPC computation party, zero-sharing processing, to obtain a fourth data component; combining the fourth data component and the data component obtained from the data message, to obtain a fifth data component; and performing arithmetic sharing processing by using the fifth data component as to-be-shared data, to obtain the first data component.

7. A non-transitory, computer-readable medium storing one or more instructions executable by a computer system to perform one or more operations, comprising:

obtaining, by each secure multi-party computation (MPC) computation party of a system comprising a data provider and n secure MPC computation parties, a first data component from a data message sent by the data provider, wherein n is an integer greater than 3, wherein the first data component is one of a plurality of data components obtained after the data provider splits private data, and wherein the first data component is an address-geocoded component; and performing, as MPC processing and to obtain a second data component, conversion of the first data component from the address-geocoded component and to a one-hot encoded component, wherein the conversion comprises obtaining a value of each bit of the one-hot encoded component based on a combination product of a value or a complement value of each bit of an address-geocoded component corresponding to each bit of the one-hot encoded component.

8. The non-transitory, computer-readable medium of claim 7, wherein a value of the $i^{th}$ bit of the one-hot encoded component is determined by:

for the $j^{th}$ bit of address geocoding, wherein j starts from 0, if the $j^{th}$ bit of a binary value of i is 1, determining that a one-hot encoded component value of the current $i^{th}$ bit is addr [0];

otherwise, determining that a one-hot encoded component value of the current $i^{th}$ bit is a complement value of addr [0];

increasing a value of j by 1, and if the $j^{th}$ bit of the binary value of i is 1, multiplying the one-hot encoded component value of the current $i^{th}$ bit by addr [j], and updating the one-hot encoded component value of the current $i^{th}$ bit by using a value obtained through multiplication; otherwise, multiplying the one-hot encoded component value of the current $i^{th}$ bit by a complement value of addr [j], and updating the one-hot encoded component value of the current $i^{th}$ bit by using a value obtained through multiplication; and performing the step of increasing a value of j by 1, until j is a highest-order bit of the address-geocoded component, to obtain a one-hot encoded component value of the $i^{th}$ bit, wherein addr [0] is a value of the $0^{th}$ bit of the address-geocoded component, and addr [j] is a value of the $j^{th}$ bit of the address-geocoded component.

9. The non-transitory, computer-readable medium of claim 8, wherein when multiplication is performed, a product of some values of addr [j] in the address-geocoded component is computed to obtain a computed product value, and multiplication of other values of addr [j] is converted into processing of addition of a plurality of addition items, wherein the plurality of addition items comprises the computed product value.

10. The non-transitory, computer-readable medium of claim 7, wherein the obtaining, by each secure MPC computation party, a first data component from a data message sent by the data provider comprises:

using, by each secure MPC computation party as the first data component, a data component obtained from the data message.

11. The non-transitory, computer-readable medium of claim 7, wherein the obtaining, by each secure MPC computation party, a first data component from a data message sent by the data provider comprises:

obtaining, by each secure MPC computation party and as an obtained data component, a data component from the data message, and performing arithmetic sharing processing by using the obtained data component as to-be-shared data, to obtain the first data component.

12. The non-transitory, computer-readable medium of claim 7, wherein the obtaining, by each secure MPC computation party, a first data component from a data message sent by the data provider comprises:

after obtaining a data component from the data message, performing, by each secure MPC computation party, zero-sharing processing, to obtain a fourth data component; combining the fourth data component and the data component obtained from the data message, to obtain a fifth data component; and performing arithmetic sharing processing by using the fifth data component as to-be-shared data, to obtain the first data component.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations, comprising:

obtaining, by each secure multi-party computation (MPC) computation party of a system comprising a data provider and n secure MPC computation parties, a first data component from a data message sent by the data provider, wherein n is an integer greater than 3, wherein the first data component is one of a plurality of data components obtained after the data provider splits private data, and wherein the first data component is an address-geocoded component; and performing, as MPC processing and to obtain a second data component, conversion of the first data component from the address-geocoded component and to a one-hot encoded component, wherein the conversion comprises obtaining a value of each bit of the one-hot encoded component based on a combination product of a value or a complement value of each bit of an address-geocoded component corresponding to each bit of the one-hot encoded component.

14. The computer-implemented system of claim 13, wherein a value of the $i^{th}$ bit of the one-hot encoded component is determined by:

for the $j^{th}$ bit of address geocoding, wherein j starts from 0, if the $j^{th}$ bit of a binary value of i is 1, determining that a one-hot encoded component value of the current $i^{th}$ bit is addr [0];

otherwise, determining that a one-hot encoded component value of the current $i^{th}$ bit is a complement value of addr [0];

increasing a value of j by 1, and if the $j^{th}$ bit of the binary value of i is 1, multiplying the one-hot encoded component value of the current $i^{th}$ bit by addr [j], and updating the one-hot encoded component value of the current $i^{th}$ bit by using a value obtained through multiplication; otherwise, multiplying the one-hot encoded component value of the current $i^{th}$ bit by a complement value of addr [j], and updating the one-hot encoded component value of the current $i^{th}$ bit by using a value obtained through multiplication; and performing the step of increasing a value of j by 1, until j is a highest-order bit of the address-geocoded component, to obtain a one-hot encoded component value of the $i^{th}$ bit, wherein addr [0] is a value of the $0^{th}$ bit of the address-geocoded component, and addr [j] is a value of the $j^{th}$ bit of the address-geocoded component.

15. The computer-implemented system of claim 14, wherein when multiplication is performed, a product of some values of addr [j] in the address-geocoded component is computed to obtain a computed product value, and multiplication of other values of addr [j] is converted into processing of addition of a plurality of addition items, wherein the plurality of addition items comprises the computed product value.

16. The computer-implemented system of claim 13, wherein the obtaining, by each secure MPC computation party, a first data component from a data message sent by the data provider comprises:

using, by each secure MPC computation party as the first data component, a data component obtained from the data message.

17. The computer-implemented system of claim 13, wherein the obtaining, by each secure MPC computation party, a first data component from a data message sent by the data provider comprises:

obtaining, by each secure MPC computation party and as an obtained data component, a data component from the data message, and performing arithmetic sharing processing by using the obtained data component as to-be-shared data, to obtain the first data component.

\* \* \* \* \*